United States Patent
Bisson et al.

(10) Patent No.: US 8,652,232 B2
(45) Date of Patent: Feb. 18, 2014

(54) PROCESS FOR SYNTHESIZING CUBIC METALLIC NANOPARTICLES IN THE PRESENCE OF TWO REDUCING AGENTS

(75) Inventors: Laure Bisson, Lyons (FR); Cecile Thomazeau, Lyons (FR); Clement Sanchez, Gif-sur-Yvette (FR); Cedric Boissiere, Paris (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 829 days.

(21) Appl. No.: 12/593,682

(22) PCT Filed: Mar. 5, 2008

(86) PCT No.: PCT/FR2008/000294
§ 371 (c)(1),
(2), (4) Date: Jul. 26, 2010

(87) PCT Pub. No.: WO2008/132314
PCT Pub. Date: Nov. 6, 2008

(65) Prior Publication Data
US 2010/0280296 A1 Nov. 4, 2010

(30) Foreign Application Priority Data
Mar. 30, 2007 (FR) .................................. 07 02409

(51) Int. Cl.
*B22F 9/24* (2006.01)
*C07C 5/02* (2006.01)
*B82Y 40/00* (2011.01)

(52) U.S. Cl.
USPC .............. 75/371; 585/273; 502/339; 977/896

(58) Field of Classification Search
None
See application file for complete search history.

(56) References Cited

U.S. PATENT DOCUMENTS

| | | | |
|---|---|---|---|
| 6,090,858 A | 7/2000 | El-Sayed | |
| 7,547,347 B2 * | 6/2009 | Yang et al. | 75/351 |
| 7,858,025 B2 * | 12/2010 | Shim et al. | 420/469 |
| 8,030,242 B2 * | 10/2011 | Uzio et al. | 502/325 |
| 8,129,199 B2 * | 3/2012 | Murphy et al. | 436/525 |
| 2005/0056118 A1 | 3/2005 | Xia et al. | |
| 2007/0068343 A1 * | 3/2007 | Lukehart et al. | 75/370 |

FOREIGN PATENT DOCUMENTS

| | | |
|---|---|---|
| FR | 2 874 515 A1 | 3/2006 |
| WO | WO 2007/057553 A1 | 5/2007 |

OTHER PUBLICATIONS

International Search Report of PCT/FR2008/000294 (Oct. 14, 2008).
J.W. Yoo et al., "Propylene Hydrogenation over Cubic Pt Nanoparticles Deposited on Alumina", Bull. Korean Chem. Soc., vol. 25, No. 6 (2004) pp. 843-846.

(Continued)

*Primary Examiner* — George Wyszomierski
(74) *Attorney, Agent, or Firm* — Millen, White, Zelano & Branigan, P.C.

(57) ABSTRACT

A process is described for preparing cubic metallic nanoparticles, comprising:
a) preparing an aqueous solution containing a source of a metal from group VIII, a reducing agent R1 and a stabilizer;
b) preparing an aqueous solution containing a source of a group VIII metal and a stabilizer at a temperature strictly higher than 70° C. and less than or equal to 80° C.;
c) mixing at least a portion of the aqueous solution obtained in step a) with the aqueous solution obtained in step b) to obtain, in the presence of a reducing agent R2, metallic nanoparticles in the cubic form representing at least 70% by number of the entire quantity of metallic nanoparticles which are formed;
d) depositing said metallic nanoparticles derived from step c) on a support.

22 Claims, 1 Drawing Sheet

(56) References Cited

OTHER PUBLICATIONS

M.M. Telkar et al., "Shape-Controlled Preparation and Catalytic Activity of Metal Nanoparticles for Hydrogenation of 2-Butyne-1,4-Diol and Styrene Oxide", Applied Catalysis A: General, vol. 273 (2004) pp. 11-19.

Z.L. Wang et al. "Steps, Ledges and Kinks on the Surfaces of Platinum Nanoparticles of Different Shapes", Surface Science, vol. 380 (1997) pp. 302-310.

X. Fu et al. "Shape-Selective Preparation and Properties of Oxalate-Stabilized Pt Colloid, Langmuir", vol. 18, No. 12 (2002) pp. 4619-4624.

T. Sau et al. "Room Temperature, High-Yield Synthesis of Multiple Shapes of Gold Nanoparticles in Aqueous Solution", J. Am. Chem. Soc., vol. 126, No. 28 (2004) pp. 8648-8649.

X. Fu et al. "Preparation of Colloidal Solutions of Thin Platinum Nanowires", J. Mater. Chem., vol. 13 (2003) pp. 1192-1195.

\* cited by examiner

PROCESS FOR SYNTHESIZING CUBIC METALLIC NANOPARTICLES IN THE PRESENCE OF TWO REDUCING AGENTS

FIELD OF THE INVENTION

The present invention concerns a process for preparing cubic metallic nanoparticles deposited on a support. Said supported nanoparticles can be used as catalysts, in particular to carry out hydrogenation processes.

PRIOR ART

Metals, in particular transition metals, have been used for a number of years for their capacity to activate a certain number of molecules such as hydrocarbons, hydrogen, oxygen or carbon monoxide. The catalytic properties of metals as regards those molecules have been the focus of a large number of studies which have demonstrated their versatility as a function of the metal, the conditions employed and also their physico-chemical characteristics.

Chemisorption activation phenomena, i.e. phenomena governed by the adsorption of reactants and the chemical interactions between said reactants and the metallic particle, depend on the physico-chemical properties of the exposed metallic surfaces. The size of the metallic particle and the coordination of the surface atoms of that particle are two characteristics which must be taken into account when producing catalysts with optimal chemisorption properties, i.e. catalysts having an ability to adsorb reactants and interact chemically with said reactants.

The size of the metallic particle is generally selected as a function of the envisaged application.

Metallic nanoparticles are known to be capable of adopting various stable forms as a function of the number of atoms of which they are composed or chemical interactions with their environment, i.e., with a reactive atmosphere, for example. The metallic particles employed in heterogeneous catalysis have morphologies with a marked isotropic character, adopting geometric forms which depend on the number of atoms constituting the particle. These geometric forms include the icosahedral form for small particles with a size which is generally less than about 10 Angstrom (1 Angstrom= $10^{-10}$ m), and the truncated cubooctahedral form for large particles.

An aim of the invention is to provide a method for preparing metallic nanoparticles deposited on a support in order to control the form of these nanoparticles, and in particular to allow the preparation of supported nanoparticles with a cubic morphology, i.e. with a form factor F in the range 0.78 to 0.81.

A certain number of methods for synthesizing nanoparticles are already well known to the skilled person.

The skilled person is aware of methods for synthesizing nanoparticles of cubic form in solution in an organic medium, for example in alcohol or a polyol, in which the growth of the nanoparticles can be controlled by adsorption of the selective agent in a single step. Reduction is generally carried out under reflux, i.e. at the boiling point of the organic medium, and the organic phase acts both as a solvent for the selective adsorption agent, generally a polymer, and as a reducing agent for the metallic precursor. Such methods have been described in Wiley B, Sun Y, Mayers B, Xia Y, Chem Eur J, 2005, 11, 454. As an example, silver nanoparticles with edge lengths of about 170 nm are formed by reducing the salt $AgNO_3$ with ethylene glycol in the presence of polyvinylpyrrolidone at 160° C. The methods suffer from the drawback of using organic compounds which are poor reducing agents and which have to be activated at high temperature.

Methods for synthesis in solution in an organic medium include some which can control the growth of the metallic nanoparticles by selecting a metal precursor which is assumed to have ligands which favour reduction and controlled growth. in these synthesis methods, decomposition of such organometallic precursors is carried out as described by Chaudret et al, C R Chimie, 6, 2003, 1019-1034. An example which may be cited is the use of long carbon chain amines and acid ligands for the synthesis of iron nanocubes, as described in Margeat O, Dumestre F, Amiens C, Chaudret B, Lecante P, Respaud P, Respaud M, Progress in solid state chemistry, 33 (2-4), 71, 2005.

In addition to solution synthesis methods carried out in an organic medium, methods for synthesis in an aqueous medium also exist. The term "aqueous medium" means a medium comprising at least one primary aqueous phase and possibly an organic phase. More particularly, the present invention relates to the field of these aqueous medium synthesis methods.

The use of aqueous medium synthesis methods using a surfactant is known for the preparation of catalysts having isotropic nanoparticles. The article by B Veisz and Z Kirali, Langmuir 2003, 19, 4817—describes the synthesis of isotropic palladium nanoparticles which are cubooctahedral in form. U.S. Pat. No. 4,714,693 describes a method for synthesizing supported nanoparticles by formation then deposition and reduction of micelles in interaction with the metallic precursor.

Nanoparticles with controlled morphologies can also be synthesized in an aqueous medium by the selective adsorption of ions, molecules, polymers or surfactants onto certain crystalline faces of the metal. Controlling the morphology by adding halide ions has also been observed by Filankembo et al (J Phys Chem B, 2003, 107, 7492). These synthesis methods are solely used for copper, silver and gold.

In the field of aqueous medium synthesis methods using the selective adsorption of polymers onto certain crystalline faces of the metal, U.S. Pat. No. 6,090,858 describes a method used to produce colloidal nanoparticles of a transition metal, with particular forms, using a stabilizer, said method comprising dissolving a mixture of a metallic precursor and a stabilizer in aqueous solution followed by reduction in the presence of a single reducing agent, hydrogen, which cannot control the form in an optimal manner. However, this method can only produce a proportion of about 60% of cubes of platinum (Narayanan R, El-Sayed M A, Nanoletters, 2004, 4 (7), 1343).

This approach of controlled growth can also be achieved by, in a first step, synthesizing isotropic nanoparticles, said nanoparticles then being used as seeds for growth in the presence of a selective adsorption agent and a suitable reducing agent. This approach, in which two reducing agent are used, has enabled cubic nanoparticles of gold to be synthesized, as described by Sau T K, Murphy C J, J Am Chem Soc, 2004, 126, 8648.

SUMMARY OF THE INVENTION

The present invention pertains to a process for preparing cubic metallic nanoparticles, comprising at least the following steps:

a) preparing at least one aqueous solution containing at least one source of at least one metal selected from metals from group VIII of the periodic table of the elements, at least one reducing agent R1 and at least one stabilizer;

b) preparing at least one aqueous solution containing at least one source of at least one metal selected from metals from group VIII of the periodic table of the elements and at least one stabilizer at a temperature strictly higher than 70° C. and less than or equal to 80° C.;

c) mixing at least a portion of the aqueous solution obtained in step a) with the aqueous solution obtained in step b) to obtain, in the presence of at least one reducing agent R2, metallic nanoparticles in the cubic form representing at least 70% by number of the entire quantity of metallic nanoparticles which are formed;

d) depositing said metallic nanoparticles derived from step c) on a support.

The supported metallic nanoparticles prepared in accordance with the process of the invention, wherein at least 70% by number are in the cubic form, are used as a catalyst for the selective hydrogenation of unsaturated hydrocarbons. In such an application, it has surprisingly been shown that such a catalyst is more active than a supported catalyst based on metallic nanoparticles wherein those which are cubic in form represent less than 70% by number. It has also been shown that the catalyst prepared using the process of the invention is more selective as regards mono-unsaturated product(s) by encouraging the formation of mono-unsaturated product(s) to the detriment of the saturated product, and it is more selective towards one mono-unsaturated isomer than towards another mono-unsaturated isomer.

DESCRIPTION OF THE INVENTION

The present invention concerns a process for preparing cubic metallic nanoparticles comprising at least the following steps:

a) preparing at least one aqueous solution containing at least one source of at least one metal selected from metals from group VIII of the periodic table of the elements, at least one reducing agent R1 and at least one stabilizer;

b) preparing at least one aqueous solution containing at least one source of at least one metal selected from metals from group VIII of the periodic table of the elements and at least one stabilizer at a temperature strictly higher than 70° C. and less than or equal to 80° C.;

c) mixing at least a portion of the aqueous solution obtained in step a) with the aqueous solution obtained in step b) to obtain, in the presence of at least one reducing agent R2, metallic nanoparticles in the cubic form representing at least 70% by number of the entire quantity of metallic nanoparticles which are formed;

d) depositing said metallic nanoparticles derived from step c) on a support.

The process of the invention results in the production of metallic nanoparticles wherein at least 70% by number are in the cubic form. Said cubic metallic nanoparticles are constituted by at least one metal selected from metals from group VIII of the periodic table of the elements. Said cubic metallic nanoparticles prepared using the process of the invention are in the form of cubes or in the form of truncated cubes using the known terminology of the skilled person. When the nanoparticles are in the form of cubes, the adjacent edges of each face of the cube form an angle of 90°. When the nanoparticles are in the form of truncated cubes, the angle formed between the adjacent edges of each face of the cube is different from 90° as the corners formed by said edges are truncated. The cubic metallic nanoparticles prepared using the process of the invention have a form factor in the range 0.78 to 0.81. When the form factor is 0.78, the cubic metallic nanoparticles are in the form of cubes. When the form factor is 0.81, the metallic nanoparticles are in the form of truncated cubes of edge a, each of the truncations of the edges being equal to a/4. Cubic metallic nanoparticles with edge a having a form factor of more than 0.78 and less than 0.81 in the form of truncated cubes wherein each of the truncations of the edges is less than a/4. Said form factor is defined by the formula $F=(4*\Pi*S)/P^2$, S being the surface area of the particle measured in the two-dimensional plane of characterization in transmission electron microscopy, P being the perimeter of the particle measured in the same plane. The surface area of the particle corresponds to the surface area of the face of the cubic nanoparticle viewed in the TEM plane of characterization and the perimeter of the particle corresponds to the perimeter of the face of the cubic nanoparticle viewed in the TEM plane of characterization. The form factor F as defined above is advantageously calculated from measurements carried out by transmission electron microscopy using methods described by Coster M, Chemant J L, Précis d' analyse d'images [Manual of image analysis], CNRS, 1985.

The proportion of cubic metallic nanoparticles with a form factor F in the range 0.78 to 0.81 is determined by statistical analysis using statistical counting rules which are known to the skilled person. In particular, a count of the number of cubic nanoparticles is carried out over a population of at least 200 nanoparticles, representative of the whole of the sample analyzed by TEM. Statistical counting is generally carried out directly on TEM images.

The metallic nanoparticles, wherein at least 70% by number are formed by cubic metallic nanoparticles, prepared using the process of the invention are constituted by at least one metal selected from metals from group VIII of the periodic table of the elements. The group VIII metal(s) is (are) preferably selected from nickel, cobalt, iron, ruthenium, platinum, palladium and iridium, highly preferably selected from cobalt, nickel, platinum and palladium and still more preferably from palladium. Said metallic nanoparticles, wherein at least 70% by number are formed by cubic metallic nanoparticles prepared using the process of the invention are advantageously constituted by at least two metals wherein at least one is selected from metals from group VIII of the periodic table of the elements, the second metal preferably being selected from metals from groups VIII and IB of the periodic table of the elements, highly preferably selected from metals from group IB and still more preferably selected from silver and gold.

Each cubic metallic nanoparticle may comprise a single metallic element selected from group VIII metals or several metallic elements at least one of which is selected from group VIII metals; for example, they may be cubic bimetallic nanoparticles, each one being constituted by a group VIII metal and a group IB metal. Preferably, said metallic nanoparticles and in particular said cubic metallic nanoparticles obtained by the process of the invention are monometallic and constituted by a group VIII metal selected from the list given above, preferably palladium. In the case of nanoparticles comprising a plurality of metallic elements, these latter may be combined in any manner known to the skilled person. It may be any mixture, an alloy, a solid solution or any structure comprising a core and a shell. In particular, when said nanoparticles are bimetallic and constituted by palladium and gold or palladium and silver, an alloy is formed.

Said cubic metallic nanoparticles prepared using the process of the invention have edge lengths in the range from a few Angstroms to several hundred nanometers. Preferably, the edge length of the faces of the cubic metallic nanoparticles is in the range 2 to 200 nm, more preferably in the range 5 to 100 nm and still more preferably in the range 5 to 50 nm. Highly advantageously, the edge length is in the range 10 to 50 nm as it has surprisingly been shown that edge lengths of more than 10 nm unexpectedly result in good catalytic performance.

Metallic nanoparticles, in particular cubic metallic nanoparticles, prepared using the process of the invention may be isolated from each other or they may form agglomerates. They may also be associated with each other by points of contact which connect them.

In accordance with the process of the invention, at least one source of at least one metal selected from metals from group VIII of the periodic table of the elements is introduced to carry out step a) and to carry out step b) of said preparation process. The group VIII metal(s) is (are) preferably selected from nickel, cobalt, iron, ruthenium, platinum, palladium and iridium, highly preferably selected from cobalt, nickel, platinum and palladium and still more preferably it is palladium. To prepare the cubic metallic nanoparticles, the metal introduced to carry out step a) is identical to that introduced to carry out said step b); preferably, it is palladium. Advantageously, a single source constituted by a single metal selected from group VIII metals is introduced to carry out step a) then to carry out step b) to obtain metallic nanoparticles. More preferably, to prepare cubic metallic nanoparticles in accordance with the process of the invention, a source of palladium is introduced to carry out step a) then a source of palladium is introduced to carry out step b). Preferably, to prepare cubic monometallic nanoparticles in accordance with the process of the invention, the source of the metal employed to carry out step a) is identical to the source of metal employed to carry out step b) of the process of the invention. To prepare cubic bimetallic nanoparticles and in the particular case in which the two metals are group VIII metals, it is essential that at least one source of at least one of the two metals be introduced to carry out said step a) and to carry out said step b). Thus, the source of the first group VIII metal may be introduced to carry out step a) and/or step b) and the source of the second group VIII metal may be introduced to carry out step a) and/or step b) provided that at least one of the two sources is present to carry out said step a) and to carry out said step b). To prepare cubic bimetallic nanoparticles and in the particular case in which one of the metals is a group VIII metal and the other metal is a group IB metal, preferably selected from gold and silver, the source of said group IB metal may be introduced to carry out step a) and/or step b).

Each of the sources of the metal employed to carry out steps a) and b) of the process of the invention may be any salt of a precursor of said metal under consideration having an oxidation number for said metal of more than 0 and which is soluble in aqueous solution, at least one metal being selected from group VIII metals. This salt may be a halide or a hydroxide of the metal under consideration, or a salt associating a halide and/or a hydroxide with an alkali, an amine group or ammonia. This salt may also be a nitrate, nitrite or sulphate of the metal under consideration, alone or in association with an amine function or ammonia. Said precursor salt of said metal may also comprise an organic ligand; as an example, it may be palladium acetate.

When preparing cubic metallic nanoparticles in accordance with the invention comprising palladium, the palladium source may advantageously be palladium chloride, palladium bromide, palladium iodide, potassium hexachloropalladate, ammonium hexachloropalladate, potassium tetrabromopalladate, potassium tetrachloropalladate, ammonium tetrachloropalladate, sodium hexachloropalladate, sodium tetrachloropalladate, palladium nitrate, palladium nitrite, diaminepalladium nitrite, palladium sulphate, tetraaminepalladium nitrate, palladium dichlorodiamine, palladium acetate or palladium acetylacetonate. Preferably, potassium hexachloropalladate, potassium tetrachloropalladate, sodium hexachloropalladate, sodium tetrachloropalladate or palladium nitrate are used.

When preparing cubic metallic nanoparticles in accordance with the invention comprising platinum, the platinum source may advantageously be platinum chloride, potassium hexachloroplatinate, ammonium hexachloroplatinate, potassium tetrabromoplatinate, potassium tetrachloroplatinate, ammonium tetrachloroplatinate, sodium hexachloroplatinate, sodium tetrachloroplatinate, platinum nitrate, platinum nitrite, diamineplatinum nitrite, platinum sulphate, tetramineplatinum nitrate, platinum dichlorodiamine, platinum acetate, platinum acetylacetonate, hexachloroplatinic acid, hexahydroxyplatinic acid, hexabromoplatinic acid, tetramineplatinum chloride, potassium hexahydroxyplatinate or sodium hexahydroxyplatinate. Preferably, potassium hexachloroplatinate, potassium tetrachloroplatinate, sodium hexachloroplatinate, sodium tetrachloroplatinate or platinum nitrate are used.

When preparing cubic metallic nanoparticles in accordance with the invention comprising silver, the source of silver may advantageously be silver acetate, silver chlorate, silver perchlorate, silver nitrate, silver nitrite or silver sulphate.

When preparing cubic metallic nanoparticles in accordance with the invention comprising gold, the source of gold may advantageously be gold chloride, gold nitrate, nitratoauric acid, chloroauric acid or gold acetate.

The molar concentration of metal(s), preferably group VIII metal and more preferably palladium used to carry out step a) and to carry out step b) of the process of the invention, is in the range $1 \times 10^{-5}$ to 1 mole/liter, preferably in the range $5 \times 10^{-5}$ to $1 \times 10^{-1}$ mole/liter, and more preferably in the range $1 \times 10^{-4}$ to $1 \times 10^{-2}$ mole/liter. Said molar concentration is that of the metal(s) present in each of the aqueous solutions prepared in step a), step b) and step c) of the process of the invention In accordance with the invention, the process for preparing cubic metallic nanoparticles uses two successive reduction steps, the first (step a)) being carried out using a reducing agent R1 and the second being carried out using a reducing agent R2 the chemical composition of which differs from that of compound R1. In accordance with the invention, compound R2 may be introduced either into the aqueous solution prepared when carrying out said step b) of the process of the invention or into the solution resulting from mixing the aqueous solution obtained in step a) with the aqueous solution obtained in step b). The reducing agent R2 is advantageously introduced into the aqueous solution prepared when carrying out said step b) of the process of the invention. The presence of the reducing agent R2 in one of steps b) or c) is essential to the preparation of the cubic metallic nanoparticles in the process of the invention; nevertheless, the timing for introducing said compound R2 is not important as long as the compound R2 is not introduced simultaneously with the reducing agent R1 into the same solution, so that the two reduction steps are carried out in succession. Thus, said compound R2 cannot be introduced when carrying out step a) of the process of the invention.

The reducing agents R1 and R2 used may be inorganic or organic in nature. Preferred inorganic reducing agents are selected from hydrogen, hydrazine, hydroxylamines, alkali borohydrides and hydrides. Preferred organic reducing agents are selected from carboxylic acids, alcohols, polyols, aldehydes, ketones and their ions. More preferably, the reducing agent R1 is selected from the group constituted by hydrogen, hydrazine, hydroxylamines, alkali borohydrides and hydrides, and more preferably R1 is the compound $NaBH_4$.

More preferably, the reducing agent R2 is selected from the group constituted by carboxylic acids, alcohols, polyols, aldehydes, ketones and their ions. Thus, it is advantageous for the reducing agent R1 to have a reducing power which is greater than that of reducing agent R2. Advantageously, sodium borohydride is used as the reducing agent R1. Advantageously, a carboxylate ion is used as the reducing agent R2. Preferably, in the case in which the reducing agent R2 employed has a protonated function such as a carboxylic acid or an alcohol, it is preferred to add a base to the aqueous solution containing said compound R2 in the protonated form. More preferably, said base is sodium hydroxide. Adding the base, preferably sodium hydroxide, can produce the corresponding anion by deprotonation of the protonated compound R2, said anion having a stronger reducing power than the protonated form. Preferably, the base is introduced in a quantity which is equimolar with respect to the reducing agent R2 in its protonated form. Advantageously, R2 is ascorbic acid or its deprotonated form, sodium ascorbate.

The molar concentration of reducing agent R1 in the aqueous solution prepared in step a) of the process of the invention is in the range $1 \times 10^{-5}$ to 1 mole/liter, preferably in the range $5 \times 10^{-5}$ to $1 \times 10^{-1}$ mole/liter, and more preferably in the range $1 \times 10^{-4}$ to $1 \times 10^{-2}$ mole/liter. Preferably, the molar concentration of said reducing agent R1 in the aqueous solution prepared in said step a) is close to that of the group VIII metal in the aqueous solution prepared in said step a). The R1/metal(s)$_{introduced\ in\ step\ a)}$ molar ratio in the aqueous solution prepared in said step a) is in the range 1 to 30, preferably in the range 1 to 10, and more preferably in the range 1 to 5. The molar concentration of reducing agent R2 in the aqueous solution prepared in step b) or c) of the process of the invention is in the range $1 \times 10^{-5}$ to 1 mole/liter, preferably in the range $5 \times 10^{-5}$ to $1 \times 10^{-1}$, and more preferably in the range $1 \times 10^{-4}$ to $1 \times 10^{-2}$ mole/liter. Preferably, the molar concentration of said reducing agent R2 in the aqueous solution prepared in said step b) or step c) is close to that of the group VIII metal in the aqueous solution prepared in said step b) or step c). The R2/metal(s)$_{introduced\ in\ step\ b)}$ molar ratio in the aqueous solution prepared in step b) or c), depending on the step during which the reducing agent R2 is introduced, is in the range 1 to 10, preferably in the range 1 to 5.

In accordance with the process of the invention, steps a) and b) are carried out in the presence of a stabilizer.

The stabilizer used to carry out step a) and that used to carry out step b) are preferably either surfactants or complexing agents. The stabilizer employed to carry out step b) may be of the same nature and the same chemical composition as that used to carry out step a) of the process of the invention, or it may differ in its nature and/or chemical composition.

Preferably, at least one stabilizer used to carry out the process of the invention is a surfactant. Thus, at least one surfactant is used as a stabilizer in carrying out step a) and/or step b) of the process of the invention. According to the invention, the surfactants used as stabilizers are organic compounds having at least one hydrophilic polar function and at least one hydrophobic hydrocarbon chain. The aqueous solution constituted by the surfactant employed as a stabilizer for carrying out step a) preferably has a molar concentration of said surfactant which is much higher than that of the composition constituted by the source of the metal employed to carry out step a).

In accordance with one of the implementations of the invention consisting of using a surfactant as a stabilizer to carry out step a) and/or step b) of the process of the invention, said surfactant is preferably any compound with general formula $R(R1)(R2)(R3)X^a,Y^b$, in which:

a and b take the values −2, −1, +1 or +2 in which a+b=0;

R is a hydrocarbon chain containing 1 to 25 carbon atoms, preferably 8 to 18;

R1, R2 and R3 are any aliphatic, aromatic or hetero aromatic groups known to the skilled person, R1, R2 and r3 possibly being identical or different, preferably identical, and more preferably R1, R2 and r3 are methyl groups;

X is an element selected from the group formed by alkalis and alkaline-earths or a group containing nitrogen or sulphur; preferably, X is a cationic quaternary ammonium type element;

Y is an anionic element such as a halide, nitrate, nitrite or sulphate or a cationic element such as an alkali or alkaline-earth metal; preferably Y is an anionic element and highly preferably a halide.

Preferably, the surfactant used to carry out step a) and/or step b) is a halogenated quaternary ammonium salt, in particular a salt with formula $H_3C(CH_2)_n(CH_3)_3N^+,Br^-$ or $(CH_3(CH_2)_nN^+,Br^-$, n being in the range 1 to 15. Highly preferably, said surfactant is cetyltrimethylammonium bromide (CTAB) with formula $H_3C—(CH_2)_{15}(CH_3)_3N^+,Br^-$. More advantageously, the surfactant is sodium dodecylsulphate (SDS) with formula $H_3C(CH_2)_{11}OSO_3Na$, sodium dodecanesulphonate with formula $H_3C(CH_2)_{11}SO_3Na$ or sodium dodecylbenzenesulphonate with formula $H_3C(CH_2)_{11}C_6H_4SO_3Na$.

In the case in which a surfactant is used as the stabilizer to carry out step a) and/or step b), it is possible to use, in addition, a co-surfactant which is different from the surfactant already used but nevertheless selected from compounds having the same general formula as that described above.

In accordance with another implementation of the invention consisting of employing a complexing agent as a stabilizer to carry out step a) and/or step b) of the process of the invention, the following are advantageously used:

any organic compound having a carbonyl function, for example any compound comprising a citrate, acetate, or acetylacetonate group, polymers such as polyvinylpyrrolidone or sodium polyacrylate, fatty acids and/or carboxylic acids such as oleic acid or hydroxyacids;

any organic compound having a perchlorate function;

any organic compound having an amine function, preferably an aliphatic amine such as hexadecylamine;

any organic compound having a phosphine function, for example triphenylphosphine or trioctylphosphine oxide, or a phosphonate function;

any organic compound having a thiol function, for example octanethiol or dodecanethiol;

any organic compound having a thiophenol, diphosphite or alcohol function, as well as any other combination associating several of the functions listed above.

Preferably, the stabilizers used to carry out said steps a) and b) have the same chemical composition; it is preferably a surfactant and more preferably cetyltrimethylammonium bromide (CTAB) with formula $H_3C—(CH_2)_{15}(CH_3)_3N^+,Br^-$.

The molar concentration of stabilizer in the aqueous solution prepared in step a) of the process of the invention is in the range 0.01 to 0.75 mole/liter, preferably in the range 0.05 to 0.5 mole/liter. The molar concentration of stabilizer in the aqueous solution prepared in step b) of the process of the invention is in the range 0.05 to 1 mole/liter, preferably in the range 0.1 to 0.5 mole/liter.

The aqueous solution constituted by the stabilizer used to carry out step a) preferably has a molar concentration of said stabilizer which is much higher than that presented by the solution constituted by the source of the metal used to carry out step a).

In accordance with step a) of the process of the invention, at least one aqueous solution is prepared containing at least one source of at least one metal selected from metals from group VIII, at least one reducing agent R1 and at least one stabilizer.

The group VIII metal(s), the reducing agent R1 and the stabilizer used to carry out said step a) are selected from the respective metals, reducing agents and stabilizers listed above in the present description. Preferably, the metal employed in said step a) is palladium. The preferred reducing agent R1 is sodium borohydride $NaBH_4$. The preferred stabilizer is cetyltrimethylammonium bromide (CTAB) with formula $H_3C—(CH_2)_{15}(CH_3)_3N^+,Br^-$.

The aqueous solution obtained at the end of said step a) is prepared by dissolving at least one source of at least one group VIII metal, at least one stabilizer and at least one reducing agent R1 at a temperature in the range 20° C. to 40° C. The reducing agent R1 is preferably added with stirring. The stabilizer, preferably the surfactant, employed to carry out said step a) is maintained at a temperature in the range 20° C. to 40° C. while the reduction step during the course of said step a) is carried out, in order to avoid crystallization of said stabilizer. Said step a) lasts between 5 minutes and 24 hours.

In the aqueous solution obtained at the end of said step a) of the process of the invention, when the stabilizer is a surfactant, the surfactant/metal(s) molar ratio is in the range 1 to 1000, preferably in the range 50 to 500 and more preferably in the range 100 to 400.

When the stabilizer is a complexing agent, the complexing agent/metal(s) molar ratio in the aqueous solution obtained at the end of step a) of the process of the invention is in the range 1 to 1000, preferably in the range 100 to 500. The $R1/metal(s)_{introduced\ in\ step\ a)}$ molar ratio in the aqueous solution prepared in said step a) is in the range 1 to 30, preferably in the range 1 to 10, and more preferably in the range 1 to 5.

In step b) of the process of the invention, at least one aqueous solution is prepared containing at least one source of at least one metal selected from metals from group VIII of the periodic table of the elements and at least one stabilizer at a temperature which is strictly more than 70° C. and less than or equal to 80° C.

The group VIII metal(s), the stabilizer and optionally the reducing agent R2 employed to carry out said step b) are selected from metals, reducing agents and stabilizers present in the respective lists described above in the present description. Preferably, the metal employed in said step b) is palladium. The preferred reducing agent R2 is sodium ascorbate. The preferred stabilizer is cetyltrimethylammonium bromide (CTAB) with formula $H_3C—(CH_2)_{15}(CH_3)_3,Br^-$.

To prepare monometallic nanoparticles, the group VIII metal employed to carry out said step b) is identical to that employed for carrying out said step a); it is preferably palladium. Preferably, the source of the metal employed to carry out step b) is identical to the source of metal used to carry out step a) of the process of the invention. To prepare bimetallic nanoparticles constituted by a group VIII metal and a group IB metal, a source of a group IB metal may be introduced during said step b); such a source of a group IB metal may or may not have been introduced during step a) of the process of the invention.

The stabilizer employed to carry out said step b) of the process of the invention is selected from surfactants and the complexing agents cited above in the present description. Preferably, it is CTAB.

The reducing agent R2 which is optionally used to carry out said step b) of the process of the invention is selected from the compounds cited above in the present description. Preferably, it is sodium ascorbate.

The aqueous solution obtained at the end of step b) is prepared by dissolving, at a temperature strictly higher than 70° C. and less than or equal to 80° C., at least one source of a group VIII metal, at least one stabilizer and optionally at least one reducing agent R2. When the reducing agent R2 is introduced to carry out said step b) of the process of the invention, it is introduced into the solution after introducing said source of a group VIII metal and said stabilizer, R2 preferably being introduced with stifling. Step b) lasts between 1 min and 2 hours.

In the aqueous solution obtained at the end of said step b) of the process of the invention, when the stabilizer is a surfactant, the surfactant/metal(s) molar ratio is in the range 5 to 500, preferably in the range 50 to 200 and more preferably in the range 50 to 100. When the stabilizer is a complexing agent, the complexing agent/metal(s) molar ratio in the aqueous solution obtained at the end of carrying out step b) of the process of the invention is in the range 1 to 500, preferably in the range 100 to 400. The $R2/metal(s)_{introduced\ in\ step\ b)}$ molar ratio in the aqueous solution prepared in step b) in the case in which the reducing agent R2 is introduced to carry out step b) is in the range 1 to 10, preferably in the range 1 to 5.

In accordance with the invention, it is essential that said step b) of the process of the invention is carried out at a temperature which is strictly higher than 70° C. and less than or equal to 80° C.

In accordance with step c) of the process of the invention, at least a portion of said aqueous solution obtained at the end of said step a) is mixed with said aqueous solution obtained at the end of said step b). The two solutions are mixed in accordance with said step c) at the same temperature as that at which step b) of the process of the invention is carried out. The duration of step c) is in the range 1 min to 72 hours. More precisely, to prepare cubic metallic nanoparticles having a form factor F of 0.78, step c) lasts in the range 1 min to 5 hours, while that duration is prolonged and is generally in the range 10 hours to 72 hours when the metallic nanoparticles are produced in the form of truncated cubes.

When the reducing agent R2 has not been introduced into the aqueous solution prepared during said step b) of the process of the invention, said compound R2 is introduced to carry out said step c) either before or after mixing the solutions from steps a) and b) of the process of the invention.

Preferably, during step c), a salt is added to control the interaction between the stabilizer introduced in step b) and the nanoparticles which are forming. This salt may be any type of inorganic compound comprising halide anions such as chloride, bromide, fluoride or nitrates, nitrites, or sulphates. Preferably, the inorganic salt added in step c) is selected from the group constituted by alkali and alkaline-earth halides. The quantity of inorganic salt added is generally in the range $10^{-4}$ to 0.5 mole/liter, preferably in the range $5\times10^{-4}$ to 0.1 mole/liter, more preferably in the range $1\times10^{-3}$ to 0.05 mole/liter of the total volume of the solution which undergoes step c).

The quantity of solution removed from the aqueous solution obtained at the end of said step a) and mixed with the aqueous solution obtained at the end of said step b) in accordance with step c) is such that the concentration of the group VIII metal, preferably palladium, reduced to an oxidation number of 0, derived from the solution prepared in said step a) and introduced into said aqueous solution obtained at the end of said step b) is in the range $15.0\times10^{-9}$ mole/liter to $16.0\times10^{-6}$ mole/liter, preferably in the range $31.0\times10^{-8}$ mole/liter to $6.5\times10^{-7}$ mole/liter.

In the mixture of at least a portion of the aqueous solution obtained in step a) with the aqueous solution obtained in step b), the concentration of metal(s), defined with respect to the quantity of metal(s) introduced to carry out said step b), is in the range $1\times10^{-5}$ to 1 mole/liter, preferably in the range $5\times10^{-5}$ to $1\times10^{-1}$ mole/liter, and more preferably in the range $1\times10^{-4}$ to $1\times10^{-2}$ mole/liter; the concentration of stabilizer, defined as the ratio of the quantity of stabilizer introduced in step b), is in the range 0.05 to 1 mole/liter, preferably in the range 0.1 to 0.5 mole/liter; the concentration of reducing agent R2 is in the range $1\times10^{-5}$ to 1 mole/liter, preferably in the range $5\times10^{-5}$ to $1\times10^{-1}$ mole/liter and more preferably in the range $1\times10^{-4}$ to $1\times10^{-2}$ mole/liter.

At the end of said step c) of the process of the invention, metallic nanoparticles in suspension in an aqueous solution are obtained.

At least 70% by number, preferably at least 73% by number, of the entire quantity of metallic nanoparticles formed have a cubic morphology. The cubic metallic nanoparticles obtained when carrying out the preparation process of the invention have a form factor in the range 0.78 to 0.81. The metallic nanoparticles which are not in the cubic form have a form factor which is not in the range 0.78 to 0.81 and do not represent more than 30% by number of the entire quantity of metallic nanoparticles which are formed. The proportion of cubic metallic nanoparticles is determined by statistical counting of all of the nanoparticles formed and viewed by transmission electron microscopy as was described above in the present description.

The metallic nanoparticles wherein at least 70% by number are in the cubic form and obtained at the end of said step c) are then deposited on a support in said step c) of the process of the invention.

The support employed to carry out said step d) is preferably based on at least one refractory oxide selected from aluminas, silica, silica-aluminas, magnesium oxide, zirconium oxide, thorium oxide, titanium oxide, taken alone or as a mixture. Preferably, said support is an alumina, a silica or a silica-alumina. Said support may also be a coal, a silico-aluminate, a clay or any other compound which is known for use as a support as defined in the invention. Said support advantageously has a BET specific surface area in the range 5 to 300 $m^2/g$. It may be used in the form of a powder, or it may be formed into beads, extrudates, trilobes, powder or a monolith.

Deposition of said metallic nanoparticles at least 70% by number of which are in the cubic form on the support surface is carried out using any means which is known to the skilled person, advantageously by dry impregnation.

Preferably, the metallic nanoparticles formed during said step c) are concentrated in the liquid in which they are contained in suspension using any means which is known to the skilled person. They are advantageously concentrated by centrifuging carried out at a speed in the range 1000 to 6000 rpm for a period in the range 15 minutes to 1 hour, for example at 5000 rpm for 45 minutes. Next, the supernatant formed, essentially and preferably entirely free of nanoparticles, is withdrawn. The concentrated solution is then dry impregnated onto a support: the solution is slowly brought into contact with the support at ambient temperature by drop-by-drop addition. The solution-support mixture is homogenized by stifling. The impregnated support of said metallic nanoparticles is then dried at a temperature in the range 10° C. to 100° C., preferably in the range 20° C. to 50° C., for a period in the range 6 to 24 hours, preferably in the range 10 to 15 hours.

In accordance with the invention, the process carries out two distinct reduction steps. The first reduction step is carried out when the source of at least one metal selected from metals from group VIII metals is brought into contact with the reducing agent R1 during step a) of the process of the invention. On reduction of said source of at least one metal from group VIII using said reducing agent R1, this first step results in the production of nanoparticle seeds which do not have a properly-determined morphology and in particular do not have a cubic morphology. This first reduction step is advantageously termed the seeding step. Said nanoparticle seeds are in suspension in an aqueous solution. The stabilizer employed to carry out said step a) can maintain said seeds in a well-dispersed form in solution by preventing the formation of agglomerates. The second reduction step is carried out during said step c) of the process of the invention when said nanoparticle seeds prepared during step a) are brought into the presence of the solution derived from step b) of the process of the invention and the reducing agent R2. In said second reduction step, generally termed the growth step, nanoparticles are formed which are not supported. On reduction of the source of at least one metal introduced in step b) using said reducing agent R2 and in the presence of the seeds prepared in step a), metallic nanoparticles are formed with a cubic morphology by growth of said seeds. In addition, said second reduction step is advantageously qualified as the growth step. The stabilizer introduced in said step b) of the process of the invention acts as a selective growth agent by encouraging the controlled growth of nanoparticle seeds in the cubic form in accordance with said step c) of the process of the invention and under the temperature conditions given above, namely a temperature of strictly more than 70° C. and less than or equal to 80° C.

A washing step e) is preferably carried out after said step d) of the process of the invention. Said step e) consists of washing said supported metallic nanoparticles. It is carried out either before or after the step for drying the impregnated support. Said support impregnated with nanoparticles is brought into contact with a water/alcohol mixture, preferably water/ethanol. After homogenization, the washing water is filtered. The operation is advantageously repeated two more times.

The present invention also pertains to a catalyst formed by supported cubic metallic nanoparticles prepared in accordance with the process of the invention.

Advantageously, said catalyst formed from said supported nanoparticles undergoes an activation treatment in a reducing atmosphere, at a temperature of less than 400° C., or less than 100° C., or even less than 80° C. or 50° C.

Said catalyst formed from said supported nanoparticles advantageously comprises one or more elements in its composition, for example elements from group IIIA advantageously selected from gallium and indium, elements from group IVA advantageously selected from germanium and tin, elements from group IB, preferably copper, elements from group IA, advantageously selected from lithium, sodium and potassium, elements from group IIA advantageously selected from magnesium, calcium, strontium and barium, and halogens. Said elements are introduced onto the catalyst by impregnation of the support comprising the metallic nanoparticles. Said elements may be impregnated before or after the activation treatment in a reducing atmosphere described above.

The amount of group IA and/or group IIA element, when present in the catalytic composition, is in the range 0.01% to 20% by weight, preferably in the range 0.01% to 10% by weight, more preferably in the range 0.01% to 5% by weight. The amount of halogen, when at least one such element is present in the catalytic composition, is in the range 0.01% to 0.2% by weight.

The amount of group VIII metal(s), advantageously palladium, present in said catalyst is preferably in the range 0.01% to 20% by weight, preferably in the range 0.01% to 10% by weight and more preferably in the range 0.01% to 1% by weight of said catalyst.

The amount of group IB metal, when such a metal is present in the catalytic composition, is in the range 0.01% to 20% by weight, preferably in the range 0.01% to 10% by weight and still more preferably in the range 0.01% to 1% by weight of said catalyst.

More precisely, the catalyst comprising said metallic nanoparticles at least 70% by number of which is in the cubic form is used for the catalytic transformation of organic molecules, in particular for the selective hydrogenation of unsaturated hydrocarbons, for example diolefins or acetylenes.

The selective hydrogenation is generally intended to purify effluents from a steam cracker or from catalytic cracking using palladium-based catalysts, as described by W K Lam, L Lloyd, Oil & Gas Journal, pp 66-70, Mar. 1972. Reference may be made to the conditions of use described in EP-A-0 899 012 for the selective hydrogenation of diolefins or acetylenes.

The operational conditions generally employed to carry out a selective hydrogenation process using the catalyst based on cubic metallic nanoparticles are a mean temperature in the range 15° C. to 200° C., a total pressure in the range 0.1% to 10 MPa and a hydrogen to hydrocarbons molar ratio in the range 1 to 150.

EXAMPLES

Figure 1:
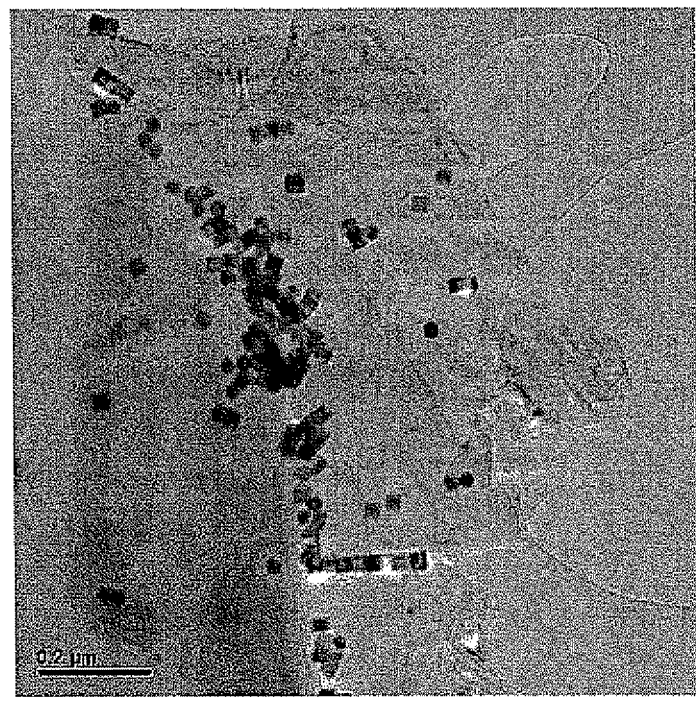
FIG. 1 is a TEM photograph which relates to example 1.

The method for producing the nanoparticles of the invention is illustrated in the following examples. The performance of catalysts comprising the nanoparticles obtained directly by the method of the invention were compared with those of catalysts obtained by prior art methods. These examples are given by way of illustration and do not limit the scope of the invention.

The morphology of the nanoparticles of the catalysts employed in these examples was characterized by transmission electron microscopy. The transmission electron microscope used was the Jeol 2010© model sold by JEOL. This microscope had an acceleration tension of 200 kV, a spatial resolution of 0.2 nm and a detection limit for the supported metallic particles of the order of 0.7 nm.

The form factor F was determined using IMAGIST© image processing software developed by Image Processing and Analysis, Princeton Gamma Tech. The cubic metallic nanoparticles was determined by statistical counting carried out directly on TEM images: for a nanoparticles population of 200 nanoparticles, representative of the whole sample analyzed by TEM, the number of cubic nanoparticles was counted.

Before carrying out the transmission electron microscopy characterization, the catalyst samples were prepared using a procedure including dissolving in ethanol, depositing a drop of solution on the analysis grid, drying and introducing said grid into the microscope.

Example 1

Synthesis of Supported Palladium Nanoparticles Mainly with a Form Factor F=0.78 (Catalyst A, in Accordance with the Invention)

Firstly, 12.5 ml of an aqueous solution of $K_2PdCl_4.3H_2O$ in a concentration of $10^{-3}$ mole/liter was added to 25 ml of an aqueous solution of cetyltrimethylammonium bromide in a concentration of 0.15 mole/liter. 3 ml of an aqueous sodium borohydride solution in a concentration of 0.01 mole/liter was then added, with stirring. After stirring for 10 minutes at 30° C., the solution a) of nanoparticle seeds which had been prepared was allowed to rest for 2 hours.

The concentration of $K_2PdCl_4$ in solution a) was $3.08 \times 10^{-4}$ M; the concentration of cetyltrimethylammonium bromide was 0.0925 M; the concentration of reducing agent $NaBH_4$ was $7.4 \times 10^{-4}$ M, giving a cetyltrimethylammonium bromide/$K_2PdCl_4$ molar ratio of 300 and a $NaBH_4/K_2PdCl_4$ molar ratio of 2.4.

Secondly, an aqueous solution of 100 ml of $K_2PdCl_4.3H_2O$ in a concentration of $3 \times 10^{-3}$ mole/liter was added to 100 ml of an aqueous solution of 0.24 mole/liter cetyltrimethylammonium bromide thermostatted at 72° C. After 5 min, 4 ml of a sodium ascorbate solution in a concentration of 0.08 mole/liter was added drop-by-drop. 360 μl of solution a) was then added to this solution, denoted solution b). Solution c) which was thus formed was stirred for 10 min, then left for 3 hours at 72° C.

The concentration of $K_2PdCl_4$ in solution b) was $1.47 \times 10^{-3}$ M; the concentration of cetyltrimethylammonium bromide was 0.1176 M; the concentration of sodium ascorbate reducing agent was $1.568 \times 10^{-3}$ M, i.e. a cetyltrimethylammonium bromide/$K_2PdCl_4$ molar ratio of 80, and a sodium ascorbate/$K_2PdCl_4$ molar ratio of 1.067.

The concentration of $K_2PdCl_4$ (defined with respect to the quantity of $K_2PdCl_4$ introduced during preparation of solution b)) in solution c) was $1.467 \times 10^{-3}$ M; the concentration of cetyltrimethylammonium bromide (defined as the ratio of the quantity of cetyltrimethylammonium bromide introduced during preparation of solution b)) was 0.1174 M; the concentration of sodium ascorbate reducing agent was $1.568 \times 10^{-3}$ M, giving a cetyltrimethylammonium bromide/$K_2PdCl_4$ molar ratio of 80.03, and a sodium ascorbate/$K_2PdCl_4$ molar ratio of 1.069. The concentration of reduced palladium with an oxidation number of 0 derived from solution a) and present in solution c) was $5.62 \times 10^{-7}$ mole/liter.

The nanoparticles formed were constituted by 75% cubes (form factor of 0.78), 10% rods (form factor <0.7), 15% polyhedra. The nanoparticles formed mainly had a form factor of 0.78. The cubes had a dimension of 30 nm measured on the edge.

After reduction of the volume of solution c) by centrifuging, the palladium nanoparticles were deposited onto an alumina by dry impregnation.

The catalyst formed from said supported nanoparticles was then washed through a Buchner funnel using 2×100 ml of a water/ethanol mixture (20% water/80% ethanol).

The catalyst was then dried overnight at 30° C. Catalyst A so prepared contained 0.3% by weight of palladium. A TEM photograph is shown in FIG. 1.

Example 2

Synthesis of Supported Palladium Nanoparticles Mainly with a Form Factor F=0.78 (Catalyst B, in Accordance with the Invention)

Firstly, 12.5 ml of an aqueous solution of $K_2PdCl_4.3H_2O$ in a concentration of $10^{-3}$ mole/liter was added to 25 ml of an aqueous solution of cetyltrimethylammonium bromide in a concentration of 0.15 mole/liter. 3 ml of an aqueous sodium borohydride solution in a concentration of 0.01 mole/liter was then added, with stirring. After stirring for 10 minutes at 30° C., the solution a) of nanoparticle seeds which had been prepared was allowed to rest for 2 hours.

The concentrations of $K_2PdCl_4$, cetyltrimethylammonium bromide and $NaBH_4$ in solution a) were identical to those in Example 1. The cetyltrimethylammonium bromide/$K_2PdCl_4$ and $NaBH_4/K_2PdCl_4$ ratios were also identical to those of Example 1.

Secondly, an aqueous solution of 100 ml of $K_2PdCl_4.3H_2O$ in a concentration of $3\times10^{-3}$ mole/liter was added to 100 ml of an aqueous solution of 0.24 mole/liter cetyltrimethylammonium bromide thermostatted at 80° C. After 5 min, 4 ml of a sodium ascorbate solution in a concentration of 0.08 mole/liter was added drop-by-drop. 360 µl of solution a) was then added to this solution, denoted solution b). Solution c) which was thus formed was stirred for 10 min, then left for 3 hours at 80° C.

The concentrations of $K_2PdCl_4$, cetyltrimethylammonium bromide and sodium ascorbate in solution b) were identical to those of Example 1. The cetyltrimethylammonium bromide/$K_2PdCl_4$ and sodium ascorbate/$K_2PdCl_4$ molar ratios were also identical to those of Example 1.

The concentrations of $K_2PdCl_4$, cetyltrimethylammonium bromide and sodium ascorbate in solution c), expressed with respect to the quantities of $K_2PdCl_4$ and cetyltrimethylammonium bromide introduced during the preparation of solution b), were identical to those of Example 1. The cetyltrimethylammonium bromide/$K_2PdCl_4$ and sodium ascorbate/$K_2PdCl_4$ molar ratios were also identical to those of Example 1. The concentration of reduced palladium with an oxidation number of 0 derived from solution a) and present in solution c) was $5.62\times10^{-7}$ mole/liter.

Figure 2:
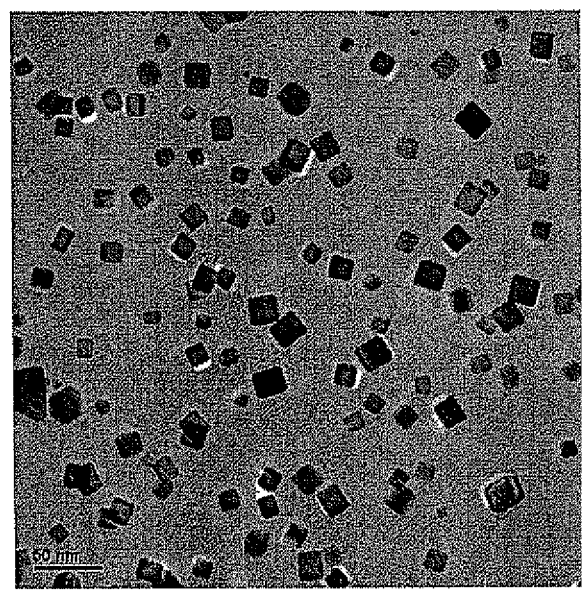
FIG. 2 is a TEM photograph which relates to example 2.

The nanoparticles formed were constituted by 74% cubes (form factor of 0.78), 7% rods (form factor <0.7), 7% polyhedra and 12% tetrahedra. A TEM photograph is shown in FIG. 2.

After reduction of the volume of solution c) by centrifuging, the palladium nanoparticles were deposited onto an alumina by dry impregnation.

The catalyst formed from said supported nanoparticles was then washed through a Buchner funnel using 2×100 ml of a water/ethanol mixture (20% water/80% ethanol).

The catalyst was then dried overnight at 30° C. Catalyst B so prepared contained 0.3% by weight of palladium.

Example 3

Synthesis of Supported Palladium Nanoparticles which do not Mainly have a Form Factor F=0.78 (Catalyst C, not in Accordance with the Invention)

Firstly, 12.5 ml of an aqueous solution of $K_2PdCl_4.3H_2O$ in a concentration of $10^{-3}$ mole/liter was added to 25 ml of an aqueous solution of cetyltrimethylammonium bromide in a concentration of 0.15 mole/liter. 3 ml of an aqueous sodium borohydride solution in a concentration of 0.01 mole/liter was then added, with stirring. After stirring for 10 minutes at 30° C., the solution a) of nanoparticle seeds which had been prepared was allowed to rest for 2 hours.

The concentrations of $K_2PdCl_4$, cetyltrimethylammonium bromide and $NaBH_4$ in solution a) were identical to those in Example 1. The cetyltrimethylammonium bromide/$K_2PdCl_4$ and $NaBH_4/K_2PdCl_4$ molar ratios were also identical to those of Example 1.

Secondly, an aqueous solution of 100 ml of $K_2PdCl_4.3H_2O$ in a concentration of $3\times10^{-3}$ mole/liter was added to 100 ml of an aqueous solution of 0.24 mole/liter cetyltrimethylammonium bromide thermostatted at 50° C. After 5 min, 4 ml of a sodium ascorbate solution in a concentration of 0.08 mole/liter was added drop-by-drop. 360 µl of solution a) was then added to this solution, denoted solution b). Solution c) which was thus formed was stirred for 10 min, then left for 3 hours at 50° C.

The concentrations of $K_2PdCl_4$, cetyltrimethylammonium bromide and sodium ascorbate in solution b) were identical to those of Example 1. The cetyltrimethylammonium bromide/$K_2PdCl_4$ and sodium ascorbate/$K_2PdCl_4$ molar ratio were also identical to those of Example 1.

The concentrations of $K_2PdCl_4$, cetyltrimethylammonium bromide and sodium ascorbate in solution c), expressed with respect to the quantities of $K_2PdCl_4$ cetyltrimethylammonium bromide introduced during the preparation of solution b), were identical to those of Example 1. The cetyltrimethylammonium bromide/$K_2PdCl_4$ and sodium ascorbate/$K_2PdCl_4$ molar ratios were also identical to those of Example 1. The concentration of reduced palladium with an oxidation number of 0 derived from solution a) and present in solution c) was $5.62\times10^{-7}$ mole/liter.

The nanoparticles formed were constituted by 58% cubes (form factor of 0.78), 11% rods (form factor <0.7), 10% polyhedra, and 21% of tetrahedra.

After reduction of the volume of solution c) by centrifuging, the palladium nanoparticles were deposited onto an alumina by dry impregnation.

The catalyst formed from said supported nanoparticles was then washed through a Buchner funnel using 2×100 ml of a water/ethanol mixture (20% water/80% ethanol).

The catalyst was then dried overnight at 30° C. Catalyst C so prepared contained 0.3% by weight of palladium.

Example 4

Synthesis of Supported Palladium Nanoparticles Having a Form Factor F=0.78 (Catalyst D, not in Accordance with the Invention)

Firstly, 12.5 ml of an aqueous solution of $K_2PdCl_4.3H_2O$ in a concentration of $10^{-3}$ mole/liter was added to 25 ml of an aqueous solution of cetyltrimethylammonium bromide in a concentration of 0.15 mole/liter. 3 ml of an aqueous sodium borohydride solution in a concentration of 0.01 mole/liter was then added, with stirring. After stirring for 10 minutes at 30° C., the solution a) of nanoparticle seeds which had been prepared was allowed to rest for 2 hours.

The concentrations of $K_2PdCl_4$, cetyltrimethylammonium bromide and $NaBH_4$ in solution a) were identical to those in Example 1. The cetyltrimethylammonium bromide/$K_2PdCl_4$ and $NaBH_4/K_2PdCl_4$ molar ratios were also identical to those of Example 1.

Secondly, an aqueous solution of 100 ml of $K_2PdCl_4.3H_2O$ in a concentration of $3\times10^{-3}$ mole/liter was added to 100 ml of an aqueous solution of 0.24 mole/liter cetyltrimethylammonium bromide thermostatted at 60° C. After 5 min, 4 ml of a sodium ascorbate solution in a concentration of 0.08 mole/ liter was added drop-by-drop. 360 µl of solution a) was then added to this solution, denoted solution b). Solution c) which was thus formed was stirred for 10 min, then left for 3 hours at 60° C.

The concentrations of $K_2PdCl_4$, cetyltrimethylammonium bromide and sodium ascorbate in solution b) were identical to those of Example 1. The cetyltrimethylammonium bromide/ $K_2PdCl_4$ and sodium ascorbate/$K_2PdCl_4$ molar ratios were identical to those of Example 1.

The concentrations of $K_2PdCl_4$, cetyltrimethylammonium bromide and sodium ascorbate in solution c), expressed with respect to the quantities of $K_2PdCl_4$ cetyltrimethylammonium bromide introduced during the preparation of solution b), were identical to those of Example 1. The cetyltrimethylammonium bromide/$K_2PdCl_4$, sodium ascorbate/$K_2PdCl_4$ molar ratios were also identical to those of Example 1. The concentration of reduced palladium with an oxidation number of 0 derived from solution a) and present in solution c) was $5.62 \times 10^{-7}$ mole/liter.

The nanoparticles formed were constituted by 62% cubes (form factor of 0.78), 11% rods (form factor <0.7), 10% polyhedra, and 17% tetrahedra.

After reduction of the volume of solution c) by centrifuging, the palladium nanoparticles were deposited onto an alumina by dry impregnation.

The catalyst formed from said supported nanoparticles was then washed through a Buchner funnel using 2×100 ml of a water/ethanol mixture (20% water/80% ethanol).

The catalyst was then dried overnight at 30° C. Catalyst D so prepared contained 0.3% by weight of palladium.

Example 5

Synthesis of Supported Palladium Nanoparticles Having a Form Factor F=0.78 (Catalyst E, not in Accordance with the Invention)

Firstly, 12.5 ml of an aqueous solution of $K_2PdCl_4.3H_2O$ in a concentration of $10^{-3}$ mole/liter was added to 25 ml of an aqueous solution of cetyltrimethylammonium bromide in a concentration of 0.15 mole/liter. 3 ml of an aqueous sodium borohydride solution in a concentration of 0.01 mole/liter was then added, with stirring. After stirring for 10 minutes at 30° C., the solution a) of nanoparticle seeds which had been prepared was allowed to rest for 2 hours.

The concentrations of $K_2PdCl_4$, cetyltrimethylammonium bromide and $NaBH_4$ in solution a) were identical to those in Example 1. The cetyltrimethylammonium bromide/$K_2PdCl_4$ and $NaBH_4/K_2PdCl_4$ ratios were also identical to those of Example 1. Secondly, an aqueous solution of 100 ml of $K_2PdCl_4.3H_2O$ in a concentration of $3 \times 10^{-3}$ mole/liter was added to 100 ml of an aqueous solution of 0.24 mole/liter cetyltrimethylammonium bromide thermostatted at 90° C. After 5 min, 4 ml of a sodium ascorbate solution in a concentration of 0.08 mole/liter was added drop-by-drop. 360 µl of solution a) was then added to this solution, denoted solution b). Solution c) which was thus formed was stirred for 10 min, then left for 3 hours at 90° C.

The concentrations of $K_2PdCl_4$, cetyltrimethylammonium bromide and sodium ascorbate in solution b) were identical to those of Example 1. The cetyltrimethylammonium bromide/ $K_2PdCl_4$ and sodium ascorbate/$K_2PdCl_4$ molar ratio were identical to those of Example 1.

The concentrations of $K_2PdCl_4$, cetyltrimethylammonium bromide and sodium ascorbate in solution c), expressed with respect to the quantities of $K_2PdCl_4$ and cetyltrimethylammonium bromide introduced during the preparation of solution b), were identical to those of Example 1. The cetyltrimethylammonium bromide/$K_2PdCl_4$, and sodium ascorbate/ $K_2PdCl_4$ molar ratios were also identical to those of Example 1. The concentration of reduced palladium with an oxidation number of 0 derived from solution a) and present in solution c) was $5.62 \times 10^{-7}$ mole/liter.

The nanoparticles formed had 68% cubes (form factor of 0.78), 14% rods (form factor <0.7), 10% polyhedra, and 8% of tetrahedra.

After reduction of the volume of solution c) by centrifuging, the palladium nanoparticles were deposited onto an alumina by dry impregnation.

The catalyst formed from said supported nanoparticles was then washed through a Buchner funnel using 2×100 ml of a water/ethanol mixture (20% water/80% ethanol).

The catalyst was then dried overnight at 30° C. Catalyst E so prepared contained 0.3% by weight of palladium.

Example 6

Synthesis of Supported Palladium Nanoparticles Mainly with a Truncation of a/6, i.e. a Form Factor F=0.80 (Catalyst F, in Accordance with the Invention)

Firstly, 12.5 ml of an aqueous solution of $K_2PdCl_4.3H_2O$ in a concentration of $10^{-3}$ mole/liter was added to 25 ml of an aqueous solution of cetyltrimethylammonium bromide in a concentration of 0.15 mole/liter. 3 ml of an aqueous sodium borohydride solution in a concentration of 0.01 mole/liter was then added, with stirring. After stirring for 10 minutes at 30° C., the solution a) of nanoparticle seeds which had been prepared was allowed to rest for 2 hours.

The concentration of $K_2PdCl_4$. in solution a) was $3.08 \times 10^{-4}$ M; the concentration of cetyltrimethylammonium bromide was 0.0925 M; the concentration of reducing agent $NaBH_4$ was $7.4 \times 10^{-4}$ M, giving a cetyltrimethylammonium bromide/$K_2PdCl_4$ molar ratio of 300 and a $NaBH_4/K_2PdCl_4$ molar ratio of 2.4.

Secondly, an aqueous solution of 100 ml of $K_2PdCl_4.3H_2O$ in a concentration of $3 \times 10^{-3}$ mole/liter was added to 100 ml of an aqueous solution of 0.24 mole/liter cetyltrimethylammonium bromide thermostatted at 72° C. After 5 min, 4 ml of a sodium ascorbate solution in a concentration of 0.08 mole/ liter was added drop-by-drop. 360 µl of solution a) was then added to this solution, denoted solution b). Solution c) which was thus formed was stirred for 10 min, then left for 48 hours at 72° C.

The concentration of $K_2PdCl_4$ in solution b) was $1.47 \times 10^{-3}$ M; the concentration of cetyltrimethylammonium bromide was 0.1176 M; the concentration of sodium ascorbate reducing agent was $1.568 \times 10^{-3}$ M, i.e. a cetyltrimethylammonium bromide/$K_2PdCl_4$ molar ratio of 80 and a sodium ascorbate/ $K_2PdCl_4$ molar ratio of 1.067.

The concentration of $K_2PdCl_4$. (defined with respect to the quantity of $K_2PdCl_4$ introduced during preparation of solution b)) in solution c) was $1.467 \times 10^{-3}$ M; the concentration of cetyltrimethylammonium bromide (defined with respect to the ratio of the quantity of cetyltrimethylammonium bromide introduced during preparation of solution b)) was 0.1174 M; the concentration of sodium ascorbate reducing agent was $1.568 \times 10^{-3}$ M, giving a cetyltrimethylammonium bromide/ $K_2PdCl_4$ molar ratio of 80.03, and a sodium ascorbate/ $K_2PdCl_4$. molar ratio of 1.069.

The nanoparticles formed were constituted by 75% of cubes with a truncation of a/6 (form factor of 0.80), 11% rods (form factor <0.7), and 14% polyhedra.

After reduction of the volume of solution c) by centrifuging, the palladium nanoparticles were deposited onto an alumina by dry impregnation.

The catalyst formed from said supported nanoparticles was then washed through a Buchner funnel using 2×100 ml of a water/ethanol mixture (20% water/80% ethanol).

The catalyst was then dried overnight at 30° C. Catalyst F so prepared contained 0.3% by weight of palladium.

Example 7

Catalytic Test for Hydrogenation of 1,3-butadiene 1,3-butadiene hydrogenation was carried out in the liquid phase (n-heptane) in a perfectly stirred "Grignard" type batch reactor under total hydrogen pressure and at a thermostatted temperature of 20° C. The reaction products were analyzed by gas chromatography. The catalytic activities, expressed in moles of $H_2$ per minute per gram of metal, were determined by monitoring the pressure drop. These activities are reported in Table 1. The selectivity k(1,3-butadiene)/k(1-butene) was expressed as the ratio of the rates of $H_2$ consumption corresponding initially to hydrogenation of 1,3-butadiene to 1-butene, then to the consumption of $H_2$ to consume the 1-butene which was in particular transformed into butane. The (1-butene) selectivity corresponded to the proportion of 1-butene formed with respect to the totality of the butenes (1-butene, 2-butene), measured at 80% conversion of 1,3-butadiene. Before the test, the catalysts were pre-treated in hydrogen at 50° C.

TABLE 1

Activities and selectivities measured by 1,3-butadiene hydrogenation

| | Activity Mol/min/g metal | Selectivity k(1,3-butadiene)/k(1-butene) | Selectivity (1-butene) |
|---|---|---|---|
| Catalyst A | 2.2 | 9 | 62% |
| Catalyst B | 2.4 | 10 | 63% |
| Catalyst C | 1.6 | 5 | 59% |
| Catalyst D | 1.8 | 5 | 60% |
| Catalyst E | 1.8 | 5 | 60% |
| Catalyst F | 2.2 | 8 | 62% |

Catalysts A, B and F wherein the Pd nanoparticles were mainly in the form of cubes or truncated cubes (proportion of >70% by number) had a catalytic activity for hydrogenation of 1,3-butadiene (per gram of palladium), a selectivity k(1,3-butadiene)/k(1-butene) and a 1-butene selectivity which was better than those of catalysts C, D, E wherein the proportion of Pd nanoparticles in the form of cubes was less than 70% by number. Hence, in addition to the advantage that catalysts A, B and F prepared using the process of the invention are more active than catalysts C, D and E, these three catalysts A, B and F are also more selective towards the mono olefin (1-butene) than towards the saturated product (butane) as proved by the k(1,3-butadiene)/k(1-butene) selectivity which was up to twice as high for catalysts A, B and F. They are also more selective towards the 1-butene isomer than towards the 2-butene isomer, as shown by the 1-butene selectivity.

The invention claimed is:

1. A process for preparing cubic metallic nanoparticles, comprising at least the following steps:

a) preparing at least one aqueous solution containing at least one source of at least one metal selected from metals from group VIII of the periodic table of the elements, at least one reducing agent R1 and at least one stabilizer;

b) preparing at least one aqueous solution containing at least one source of at least one metal selected from metals from group VIII of the periodic table of the elements and at least one stabilizer at a temperature strictly higher than 70° C. and less than or equal to 80° C.; and c) mixing at least a portion of the aqueous solution obtained in step a) with the aqueous solution obtained in step b) to obtain, in the presence of at least one reducing agent R2 to form a suspension of, metallic nanoparticles in the cubic or truncated cubic form representing at least 70% by number of the entire quantity of metallic nanoparticles which are formed.

2. A process according to claim 1, in which the group VIII metal(s) employed to carry out said steps a) and b) is (are) selected from the group consisting of cobalt, nickel, platinum and palladium.

3. A process according to claim 1, in which the cubic monometallic nanoparticles prepared are constituted of palladium.

4. A process according to claim 1, in which cubic bimetallic nanoparticles are prepared by introducing a source of a group IB metal to carry out step a) and/or step b).

5. A process according to claim 1, in which the reducing agent R2 is introduced either into the aqueous solution prepared during the course of said step b) or into the solution resulting from mixing the aqueous solution obtained in step a) with the aqueous solution obtained in step b).

6. A process according to claim 1, in which the reducing agent R1 is selected from the group consisting of hydrogen, hydrazine, hydroxylamines, hydrides and the alkali borohydrides.

7. A process according to claim 6, in which the reducing agent R1 is the compound $NaBH_4$.

8. A process according to claim 7, in which the reducing agent R2 is sodium ascorbate.

9. A process according to claim 1, in which the reducing agent R2 is selected from the group consisting of carboxylic acids, alcohols, polyols, aldehydes, ketones and their ions.

10. A process according to claim 1, in which the stabilizer employed to carry out step a) and that employed to carry out step b) are either surfactants or complexing agents.

11. A process according to claim 1, comprising introducing at least one surfactant as a stabilizer in step a) and/or step b).

12. A process according to claim 11, in which the surfactant in step a) and/or step b) is a halogenated quaternary ammonium salt.

13. A process according to claim 11, in which the surfactant in step a) and step b) is cetyltrimethylammonium bromide.

14. A process according to claim 11, in which in the aqueous solution obtained at the end of said step a), the surfactant/metal(s) molar ratio is in the range of 1 to 1000 and the molar ratio of R1/metal(s) introduced in step a) is in the range of 1 to 30.

15. A process according to claim 11 in which, in the aqueous solution obtained at the end of said step b), the surfactant/metal(s) molar ratio is in the range of 5 to 500.

16. A process according to claim 1, in which said step c) is carried out at the same temperature as that at which said step b) is carried out.

17. A process according to claim 1 in which, in the mixture of step c), the concentration of metal(s), defined with respect to the quantity of metal(s) introduced to carry out said step b), is in the range of $1\times10^{-5}$ to 1 mole/liter, the concentration of stabilizer, defined as the ratio of the quantity of stabilizer introduced in step b), is in the range of 0.05 to 1 mole/liter, and the concentration of reducing agent R2 is in the range of $1\times10^{-5}$ to 1 mole/liter.

18. A process for preparing a catalyst comprising supported cubic metallic nanoparticles, comprising at least the following steps:
  a) preparing at least one aqueous solution containing at least one source of at least one metal selected from metals from group VIII of the periodic table of the elements, at least one reducing agent R1 and at least one stabilizer;
  b) preparing at least one aqueous solution containing at least one source of at least one metal selected from metals from group VIII of the periodic table of the elements and at least one stabilizer at a temperature strictly higher than 70° C. and less than or equal to 80° C.;
  c) mixing at least a portion of the aqueous solution obtained in step a) with the aqueous solution obtained in step b) to obtain, in the presence of at least one reducing agent R2, metallic nanoparticles in the cubic form representing at least 70% by number of the entire quantity of metallic nanoparticles which are formed;
  d) depositing said metallic nanoparticles derived from step c) on a support.

19. A process according to claim 18, which comprises at least one step e) following said step d), of washing said supported nanoparticles.

20. A process according to claim 19, in which the length of the edges of the faces of resultant washed cubic metallic nanoparticles is in the range of 2 to 200 nm.

21. A process according to claim 18, in which the support employed to carry out said step d) is an alumina, a silica or a silica-alumina.

22. A process according to claim 18, further comprising carrying out selective hydrogenation of unsaturated hydrocarbons in the presence of the catalyst.

* * * * *

UNITED STATES PATENT AND TRADEMARK OFFICE
CERTIFICATE OF CORRECTION

PATENT NO. : 8,652,232 B2 Page 1 of 1
APPLICATION NO. : 12/593682
DATED : February 18, 2014
INVENTOR(S) : Bisson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1129 days.

Signed and Sealed this

Twenty-ninth Day of September, 2015

Michelle K. Lee
*Director of the United States Patent and Trademark Office*